United States Patent
Lee

(10) Patent No.: US 8,971,815 B1
(45) Date of Patent: *Mar. 3, 2015

(54) SELECTING MODULATION AND CODING SCHEME IN THE PRESENCE OF INTERFERENCE

(71) Applicant: Marvell International Ltd., Hamilton (BM)

(72) Inventor: Jungwon Lee, San Diego, CA (US)

(73) Assignee: Marvell International Ltd., Hamilton (BM)

(*) Notice: Subject to any disclaimer, the term of this patent is extended or adjusted under 35 U.S.C. 154(b) by 0 days.

This patent is subject to a terminal disclaimer.

(21) Appl. No.: 14/257,446

(22) Filed: Apr. 21, 2014

Related U.S. Application Data

(63) Continuation of application No. 13/742,081, filed on Jan. 15, 2013, now Pat. No. 8,712,333, which is a continuation of application No. 13/482,534, filed on May 29, 2012, now Pat. No. 8,355,677, which is a (Continued)

(51) Int. Cl.
 *H04B 1/00* (2006.01)
 *H04L 27/00* (2006.01)
 (Continued)

(52) U.S. Cl.
 CPC .......... *H04L 27/0012* (2013.01); *H04L 1/0003* (2013.01); *H04L 1/0009* (2013.01); *H04L 25/08* (2013.01)
 USPC ............ 455/63.1; 455/67.11; 455/67.13; 455/69; 370/342

(58) Field of Classification Search
 USPC ............ 455/63.1, 67.11, 67.13, 69, 114.2, 455/127.4; 370/342, 335, 259; 375/299
 See application file for complete search history.

(56) References Cited

U.S. PATENT DOCUMENTS 3,655,034 A * 4/1972 Stollman et al. .............. 206/454
5,619,503 A   4/1997 Dent (Continued)

FOREIGN PATENT DOCUMENTS

WO   WO-2006034020 A1   3/2006
WO   WO-2007038531 A2   4/2007

OTHER PUBLICATIONS

Javaudin, Jean-Philippe, et al., "On Inter-Cell Interefrence in OFDMA Wireless Systems," Proceedings of the European Signal Processing Conference, Sep. 9, 2005; pp. 1-4.

(Continued)

*Primary Examiner* — Minh D Dao

(57) ABSTRACT

A sensing module determines whether a signal sensed in a wireless channel is noise or is modulated by a remote device and attempts to determine, in response to the signal being modulated, a modulation scheme of the signal. A capacity determination module determines capacities of the wireless channel to transmit data using a plurality of modulation schemes. In response to the modulation scheme of the signal being determinable, the plurality of modulation schemes includes the modulation scheme of the signal. In response to the modulation scheme of the signal being indeterminable, the plurality of modulation schemes includes one or more modulation schemes that the remote device is configured to use to modulate the signal. A transmit module selects a first modulation scheme of the plurality of modulation schemes based on the capacities of the wireless channel and transmits data over the wireless channel using the first modulation scheme.

13 Claims, 9 Drawing Sheets

Related U.S. Application Data continuation of application No. 12/121,254, filed on May 15, 2008, now Pat. No. 8,190,092.

(60) Provisional application No. 60/968,748, filed on Aug. 29, 2007.

(51) Int. Cl.
  *H04L 1/00* (2006.01)
  *H04L 25/08* (2006.01)

(56) References Cited

U.S. PATENT DOCUMENTS

| | | | |
|---|---|---|---|
| 5,641,068 A * | 6/1997 | Warner | 206/523 |
| 5,762,170 A * | 6/1998 | Shyr et al. | 190/109 |
| 6,470,047 B1 | 10/2002 | Kleinerman et al. | |
| 6,912,249 B2 | 6/2005 | Haartsen | |
| 7,184,703 B1 | 2/2007 | Naden et al. | |
| 7,386,072 B2 | 6/2008 | Uno | |
| 7,386,277 B2 * | 6/2008 | Cho et al. | 455/69 |
| 7,453,959 B2 | 11/2008 | Kim et al. | |
| 7,474,640 B2 | 1/2009 | Doron et al. | |
| 7,653,153 B2 | 1/2010 | Tosato et al. | |
| 7,697,466 B2 | 4/2010 | Hashimoto et al. | |
| 8,135,098 B2 | 3/2012 | Lee et al. | |
| 8,190,092 B1 * | 5/2012 | Lee | 455/63.1 |
| 8,243,860 B1 | 8/2012 | Lee et al. | |
| 8,355,677 B1 | 1/2013 | Lee | |
| 2002/0044614 A1 | 4/2002 | Molnar et al. | |
| 2003/0063587 A1 | 4/2003 | Cho et al. | |
| 2004/0022176 A1 | 2/2004 | Hashimoto et al. | |
| 2004/0091058 A1 | 5/2004 | Tosato et al. | |
| 2004/0125883 A1 | 7/2004 | Chang et al. | |
| 2005/0278609 A1 | 12/2005 | Kim et al. | |
| 2006/0188031 A1 | 8/2006 | Liu | |
| 2006/0203943 A1 | 9/2006 | Scheim et al. | |
| 2007/0070932 A1 | 3/2007 | Doron et al. | |
| 2007/0261235 A1 * | 11/2007 | Byrd et al. | 29/832 |
| 2008/0025442 A1 | 1/2008 | Hwang et al. | |
| 2008/0056396 A1 | 3/2008 | Li | |
| 2009/0016456 A1 | 1/2009 | Li et al. | |
| 2009/0046800 A1 | 2/2009 | Xu et al. | |
| 2009/0294235 A1 * | 12/2009 | Santy et al. | 190/100 |
| 2010/0272167 A1 | 10/2010 | Liao et al. | |
| 2011/0014863 A1 * | 1/2011 | Foster | 455/1 |
| 2011/0162879 A1 * | 7/2011 | Bunyan et al. | 174/378 |
| 2012/0148000 A1 | 6/2012 | Lee et al. | |

OTHER PUBLICATIONS

Kettunen, Kimmo, et al., "Iterative Multiuser Receiver Utilizing Soft Decoding Information," Proceedings of the IEEE International Conference on Communications, Jun. 6, 1999; pp. 942-946.

Wubben, D., et al. "Efficient Algorithm for Decoding Layered Space—Time Codes," Electronics Letters, vol. 37, No. 22, Oct. 25, 2011; pp. 1348-1350.

Heath et al., "Antenna Selection for Spatial Multiplexing Systems Based on Minimum Error Rate"; Proc. IEEE International Conference on Communications; Jun. 2001; 5 pages.

* cited by examiner

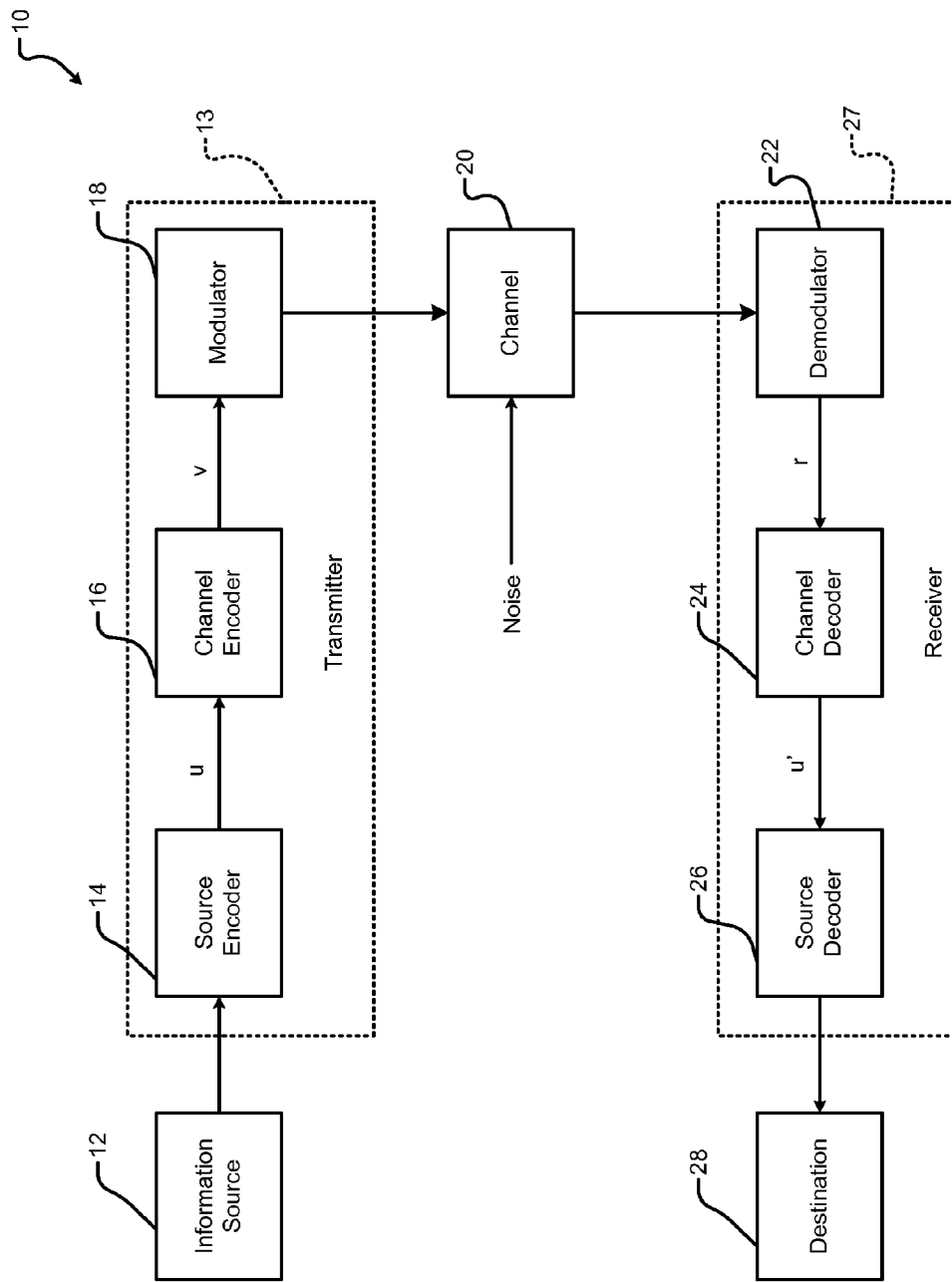
FIG. 1
_Prior Art_

| MCS No. | Modulation and Coding Scheme (MCS) | Data Rate (Capacity) | Threshold Capacity |
|---|---|---|---|
| 1 | QPSK 1/3 | 2/3 bits/symbol | 1 |
| 2 | QPSK 2/3 | 4/3 bits/symbol | 1.5 |
| 3 | QPSK 3/4 | 1.5 bits/symbol | 1.7 |
| 4 | 16QAM 1/3 | 4/3 bits/symbol | 1.8 |
| 5 | 16QAM 2/3 | 8/3 bits/symbol | 3 |

FIG. 2B

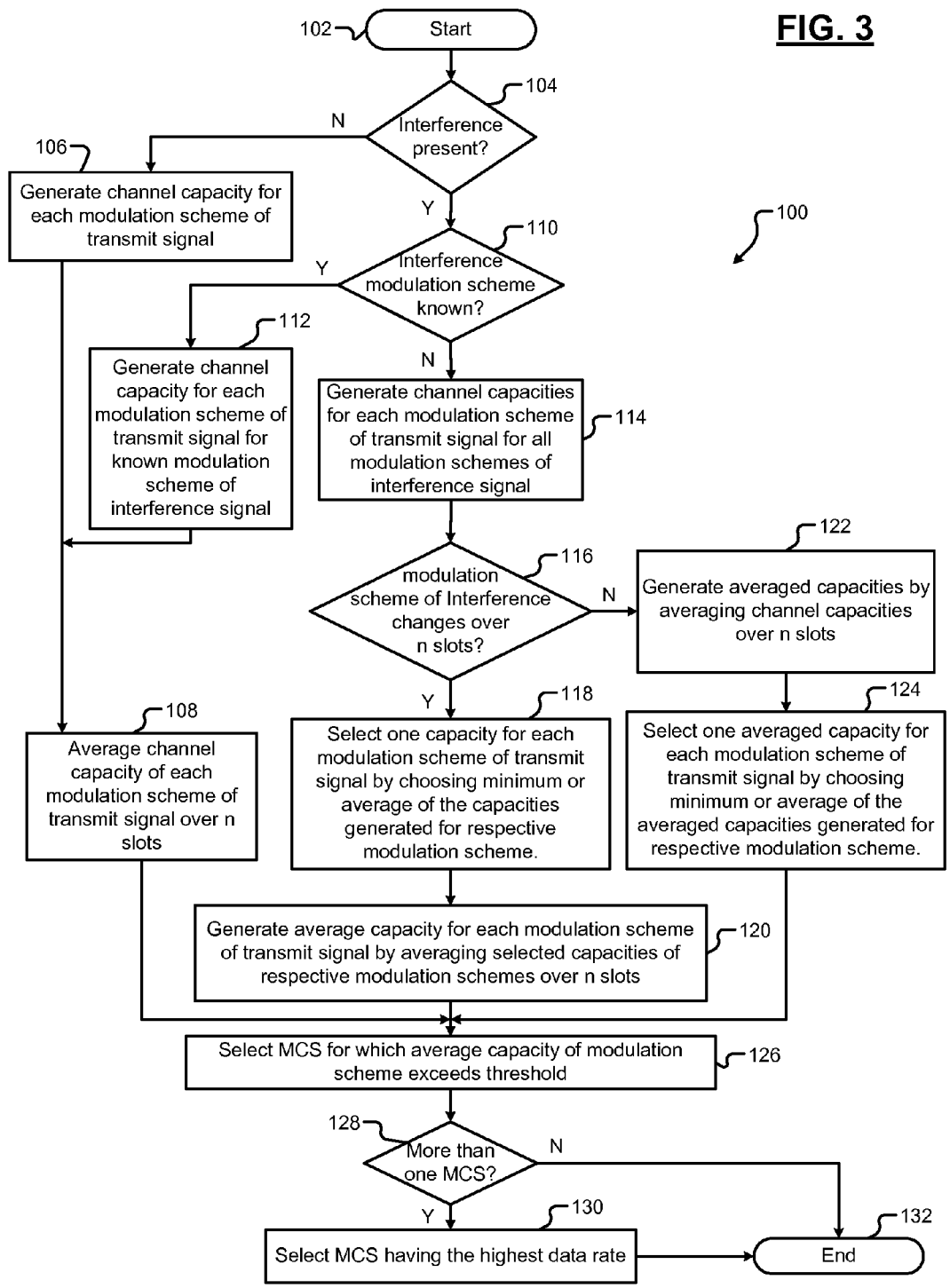

SELECTING MODULATION AND CODING SCHEME IN THE PRESENCE OF INTERFERENCE

CROSS-REFERENCE TO RELATED APPLICATIONS

This present disclosure is a continuation of U.S. patent application Ser. No. 13/742,081 (now U.S. Pat. No. 8,712,333), filed on Jan. 15, 2013, which is a continuation of U.S. patent application Ser. No. 13/482,534 (now U.S. Pat. No. 8,355,677), filed on May 29, 2012, which is a continuation of U.S. patent application Ser. No. 12/121,254 (now U.S. Pat. No. 8,190,092), filed on May 15, 2008, which claims the benefit of U.S. Provisional Application No. 60/968,748, filed on Aug. 29, 2007. The entire disclosures of the above referenced applications are incorporated herein by reference.

This application is related to U.S. Provisional Application No. 60/917,433 filed May 11, 2007 and U.S. Provisional Application No. 60/950,425 filed Jul. 18, 2007. The entire disclosures of the above referenced applications are incorporated herein by reference.

FIELD

The present disclosure relates to wireless communication systems, and more particularly to selecting a suitable modulation and coding scheme (MCS) to transmit signals in the presence of interference.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Referring now to FIG. 1, a typical communication system 10 comprises an information source 12, a transmitter 13, a communication channel 20, a receiver 27, and a destination 28. The transmitter 13 comprises a source encoder 14, a channel encoder 16, and a modulator 18. The receiver 27 comprises a demodulator 22, a channel decoder 24, and a source decoder 26.

The information source 12 may be an analog source such as a sensor that outputs information as continuous waveforms or a digital source such as a computer that outputs information in a digital form. The source encoder 14 converts the output of the information source 12 into a sequence of binary digits (bits) called an information sequence u. The channel encoder 16 converts the information sequence u into a discrete encoded sequence v called a codeword. The modulator 18 transforms the codeword into a waveform of duration T seconds that is suitable for transmission.

The waveform output by the modulator 18 is transmitted via the communication channel 20. Typical examples of the communication channel 20 are telephone lines, wireless communication channels, optical fiber cables, etc. Noise, such as electromagnetic interference, inter-channel crosstalk, etc., may corrupt the waveform.

The demodulator 22 receives the waveform. The demodulator 22 processes each waveform and generates a received sequence r that is either a discrete (quantized) or a continuous output. The channel decoder 24 converts the received sequence r into a binary sequence u' called an estimated information sequence. The source decoder 26 converts u' into an estimate of the output of the information source 12 and delivers the estimate to the destination 28. The estimate may be a faithful reproduction of the output of the information source 12 when u' resembles u despite decoding errors that may be caused by the noise.

In wireless communication systems, channel quality depends on the amount of noise and/or interference present in a channel. Channel quality is good when the amount of noise and/or interference present in the channel is low. Channel quality is bad when the amount of noise and/or interference present in the channel is high.

When channel quality is good, data may be reliably transmitted using codes having high data rates, where the number of redundant or parity bits used is low relative to the number of data bits. Conversely, when channel quality is bad, data may be reliably transmitted using codes having low data rates, where the number of redundant or parity bits used is high relative to the number of data bits.

Depending on channel quality, transmitters may use different modulation and coding schemes (MCSs) to transmit data. Each MCS may include a different code for encoding data and a different modulation scheme for modulating encoded data. Based on the code used, each MCS may have a different spectral efficiency, which is a ratio of data rate (also called coding rate) to channel bandwidth. Spectral efficiency is high or low when codes used have high or low data rates, respectively. Transmitters may adaptively select MCSs having high or low spectral efficiencies when channel quality is good or bad, respectively.

SUMMARY

A wireless device comprises an interference sensing module, a modulation and coding schemes (MCS) selection module, and a transmit module. The interference sensing module selectively receives an interference signal over a channel. The interference signal is modulated using P MCSs, where P is an integer greater than or equal to 1. The MCS selection module selects an MCS based on the P MCSs. The transmit module transmits a transmit signal over the channel using the MCS.

In another feature, the wireless device further comprises a channel capacity module that generates modulation constrained capacities (MCCs) for the channel based on first modulation schemes of the P MCSs and second modulation schemes of Q MCSs that include the MCS, where Q is an integer greater than 1.

In another feature, the wireless device further comprises a capacity selection module that selects one of the MCCs for each of the second modulation schemes and that generates selected capacities for the second modulation schemes.

In another feature, the capacity selection module generates the selected capacities by one of selecting a smallest of the MCCs and averaging the MCCs of respective ones of the second modulation schemes.

In another feature, the wireless device further comprises a capacity averaging module that averages the selected capacities over a plurality of slots when the interference signal is modulated using a plurality of the first modulation schemes over the slots and that generates average capacities for the second modulation schemes, wherein the slots include one of time slots and frequency slots.

In another feature, the MCS selection module selects one of the Q MCSs as the MCS when one of the average capacities of one of the second modulation schemes corresponding to the one of the Q MCSs is greater than a threshold capacity of the one of the Q MCSs.

In another feature, when the average capacities of a plurality of the second modulation schemes are greater than threshold capacities of corresponding ones of the Q MCSs, the MCS selection module selects one of the ones of the Q MCSs having a highest data rate as the MCS.

In another feature, the wireless device further comprises a capacity averaging module that averages the MCCs over a plurality of slots when the interference signal is modulated using one of the first modulation schemes over the slots and that generates average MCCs, wherein the slots include one of time slots and frequency slots.

In another feature, the wireless device further comprises a capacity selection module that selects one of the average MCCs for each of the second modulation schemes and that generates selected capacities for the second modulation schemes.

In another feature, the capacity selection module generates the selected capacities by one of selecting a smallest of the average MCCs and averaging the average MCCs of respective ones of the second modulation schemes.

In another feature, the MCS selection module selects one of the Q MCSs as the MCS when one of the selected capacities of one of the second modulation schemes corresponding to the one of the Q MCSs is greater than a threshold capacity of the one of the Q MCSs.

In another feature, when the selected capacities of a plurality of the second modulation schemes are greater than threshold capacities of corresponding ones of the Q MCSs, the MCS selection module selects one of the ones of the Q MCSs having a highest data rate as the MCS.

In another feature, a cellular communication system comprises the wireless device and a base station (BS), wherein the wireless device transmits the MCS to the BS, and wherein the BS transmits data to the wireless device using the MCS.

In another feature, a cellular communication system comprises a plurality of the wireless devices of and a plurality of base stations (BSs), wherein a first of the plurality of the wireless device (Device1) is associated with a first of the BSs (BS1), and wherein a second of the plurality of the wireless device (Device2) is associated with a second of the BSs (BS2). At least one of the BS2 and the Device2 transmit data using the P MCSs. The BS1 selects and transmits the MCS to the Device1. The Device1 transmits data to the BS1 using the MCS.

In still other features, a method comprises selectively receiving an interference signal over a channel. The interference signal is modulated using P modulation and coding schemes (MCSs), where P is an integer greater than or equal to 1. The method further comprises selecting an MCS based on the P MCSs and transmitting a transmit signal over the channel using the MCS.

In another feature, the method further comprises generating modulation constrained capacities (MCCs) for the channel based on first modulation schemes of the P MCSs and second modulation schemes of Q MCSs that include the MCS, where Q is an integer greater than 1.

In another feature, the method further comprises selecting one of the MCCs for each of the second modulation schemes and generating selected capacities for the second modulation schemes.

In another feature, the method further comprises generating the selected capacities by one of selecting a smallest of the MCCs and averaging the MCCs of respective ones of the second modulation schemes.

In another feature, the method further comprises averaging the selected capacities over a plurality of slots when the interference signal is modulated using a plurality of the first modulation schemes over the slots and generating average capacities for the second modulation schemes, wherein the slots include one of time slots and frequency slots.

In another feature, the method further comprises selecting one of the Q MCSs as the MCS when one of the average capacities of one of the second modulation schemes corresponding to the one of the Q MCSs is greater than a threshold capacity of the one of the Q MCSs.

In another feature, when the average capacities of a plurality of the second modulation schemes are greater than threshold capacities of corresponding ones of the Q MCSs, the method further comprises selecting one of the ones of the Q MCSs having a highest data rate as the MCS.

In another feature, the method further comprises averaging the MCCs over a plurality of slots when the interference signal is modulated using one of the first modulation schemes over the slots and generating average MCCs, wherein the slots include one of time slots and frequency slots.

In another feature, the method further comprises selecting one of the average MCCs for each of the second modulation schemes and generating selected capacities for the second modulation schemes.

In another feature, the method further comprises generating the selected capacities by one of selecting a smallest of the average MCCs and averaging the average MCCs of respective ones of the second modulation schemes.

In another feature, the method further comprises selecting one of the Q MCSs as the MCS when one of the selected capacities of one of the second modulation schemes corresponding to the one of the Q MCSs is greater than a threshold capacity of the one of the Q MCSs.

In another feature, when the selected capacities of a plurality of the second modulation schemes are greater than threshold capacities of corresponding ones of the Q MCSs, the method further comprises selecting one of the ones of the Q MCSs having a highest data rate as the MCS.

In another feature, the method further comprises selecting and transmitting the MCS from a mobile station (MS) to a base station (BS) of a cellular communication system and transmitting data from the BS to the MS using the MCS.

In another feature, the method further comprises selecting and transmitting the MCS from a first base station (BS1) to a first mobile station (MS1) that is associated with the BS1 and transmitting data from the MS1 to the BS1 using the MCS when a second base station (BS2) and a second mobile station (MS2) communicate using the P MCSs.

In still other features, a wireless device comprises interference sensing means for selectively receiving an interference signal over a channel. The interference signal is modulated using P modulation and coding schemes (MCSs), where P is an integer greater than or equal to 1. The wireless device further comprises MCS selection means for selecting an MCS based on the P MCSs and transmit means for transmitting a transmit signal over the channel using the MCS.

In another feature, the wireless device further comprises channel capacity means for generating modulation constrained capacities (MCCs) for the channel based on first modulation schemes of the P MCSs and second modulation schemes of Q MCSs that include the MCS, where Q is an integer greater than 1.

In another feature, the wireless device further comprises capacity selection means for selecting one of the MCCs for each of the second modulation schemes and generating selected capacities for the second modulation schemes.

In another feature, the capacity selection means generates the selected capacities by one of selecting a smallest of the MCCs and averaging the MCCs of respective ones of the second modulation schemes.

In another feature, the wireless device further comprises capacity averaging means for averaging the selected capacities over a plurality of slots when the interference signal is modulated using a plurality of the first modulation schemes over the slots and generating average capacities for the second modulation schemes, wherein the slots include one of time slots and frequency slots.

In another feature, the MCS selection means selects one of the Q MCSs as the MCS when one of the average capacities of one of the second modulation schemes corresponding to the one of the Q MCSs is greater than a threshold capacity of the one of the Q MCSs.

In another feature, when the average capacities of a plurality of the second modulation schemes are greater than threshold capacities of corresponding ones of the Q MCSs, the MCS selection means selects one of the ones of the Q MCSs having a highest data rate as the MCS.

In another feature, the wireless device further comprises capacity averaging means for averaging the MCCs over a plurality of slots when the interference signal is modulated using one of the first modulation schemes over the slots and generating average MCCs, wherein the slots include one of time slots and frequency slots.

In another feature, the wireless device further comprises capacity selection means for selecting one of the average MCCs for each of the second modulation schemes and generating selected capacities for the second modulation schemes.

In another feature, the capacity selection means generates the selected capacities by one of selecting a smallest of the average MCCs and averaging the average MCCs of respective ones of the second modulation schemes.

In another feature, the MCS selection means selects one of the Q MCSs as the MCS when one of the selected capacities of one of the second modulation schemes corresponding to the one of the Q MCSs is greater than a threshold capacity of the one of the Q MCSs.

In another feature, when the selected capacities of a plurality of the second modulation schemes are greater than threshold capacities of corresponding ones of the Q MCSs, the MCS selection means selects one of the ones of the Q MCSs having a highest data rate as the MCS.

In another feature, a cellular communication system comprises the wireless device and a base station (BS), wherein the wireless device transmits the MCS to the BS, and wherein the BS transmits data to the wireless device using the MCS.

In another feature, a cellular communication system comprises a plurality of the wireless devices and a plurality of base stations (BSs), wherein a first of the plurality of the wireless device (Device1) is associated with a first of the BSs (BS1), and wherein a second of the plurality of the wireless device (Device2) is associated with a second of the BSs (BS2). At least one of the BS2 and the Device2 transmit data using the P MCSs. The BS1 selects and transmits the MCS to the Device1. The Device1 transmits data to the BS1 using the MCS.

In still other features, a computer program executed by a processor comprises selectively receiving an interference signal over a channel. The interference signal is modulated using P modulation and coding schemes (MCSs), where P is an integer greater than or equal to 1. The computer program further comprises selecting an MCS based on the P MCSs and transmitting a transmit signal over the channel using the MCS.

In another feature, the computer program further comprises generating modulation constrained capacities (MCCs) for the channel based on first modulation schemes of the P MCSs and second modulation schemes of Q MCSs that include the MCS, where Q is an integer greater than 1.

In another feature, the computer program further comprises selecting one of the MCCs for each of the second modulation schemes and generating selected capacities for the second modulation schemes.

In another feature, the computer program further comprises generating the selected capacities by one of selecting a smallest of the MCCs and averaging the MCCs of respective ones of the second modulation schemes.

In another feature, the computer program further comprises averaging the selected capacities over a plurality of slots when the interference signal is modulated using a plurality of the first modulation schemes over the slots and generating average capacities for the second modulation schemes, wherein the slots include one of time slots and frequency slots.

In another feature, the computer program further comprises selecting one of the Q MCSs as the MCS when one of the average capacities of one of the second modulation schemes corresponding to the one of the Q MCSs is greater than a threshold capacity of the one of the Q MCSs.

In another feature, when the average capacities of a plurality of the second modulation schemes are greater than threshold capacities of corresponding ones of the Q MCSs, the computer program further comprises selecting one of the ones of the Q MCSs having a highest data rate as the MCS.

In another feature, the computer program further comprises averaging the MCCs over a plurality of slots when the interference signal is modulated using one of the first modulation schemes over the slots and generating average MCCs, wherein the slots include one of time slots and frequency slots.

In another feature, the computer program further comprises selecting one of the average MCCs for each of the second modulation schemes and generating selected capacities for the second modulation schemes.

In another feature, the computer program further comprises generating the selected capacities by one of selecting a smallest of the average MCCs and averaging the average MCCs of respective ones of the second modulation schemes.

In another feature, the computer program further comprises selecting one of the Q MCSs as the MCS when one of the selected capacities of one of the second modulation schemes corresponding to the one of the Q MCSs is greater than a threshold capacity of the one of the Q MCSs.

In another feature, when the selected capacities of a plurality of the second modulation schemes are greater than threshold capacities of corresponding ones of the Q MCSs, the computer program further comprises selecting one of the ones of the Q MCSs having a highest data rate as the MCS.

In another feature, the computer program further comprises selecting and transmitting the MCS from a mobile station (MS) to a base station (BS) of a cellular communication system and transmitting data from the BS to the MS using the MCS.

In another feature, the computer program further comprises selecting and transmitting the MCS from a first base station (BS1) to a first mobile station (MS1) that is associated with the BS1 and transmitting data from the MS1 to the BS1 using the MCS when a second base station (BS2) and a second mobile station (MS2) communicate using the P MCSs.

In still other features, the systems and methods described above are implemented by a computer program executed by one or more processors. The computer program can reside on a computer readable medium such as but not limited to memory, nonvolatile data storage, and/or other suitable tangible storage mediums.

Further areas of applicability of the present disclosure will become apparent from the detailed description, the claims and the drawings. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a functional block diagram of an exemplary communication system according to the prior art;

FIG. 2B is a table of exemplary MCSs that may be used to transmit signals according to the present disclosure;

FIG. 3 is a flowchart of an exemplary method for selecting an MCS to transmit signals according to the present disclosure;

DETAILED DESCRIPTION

Figure 2A:
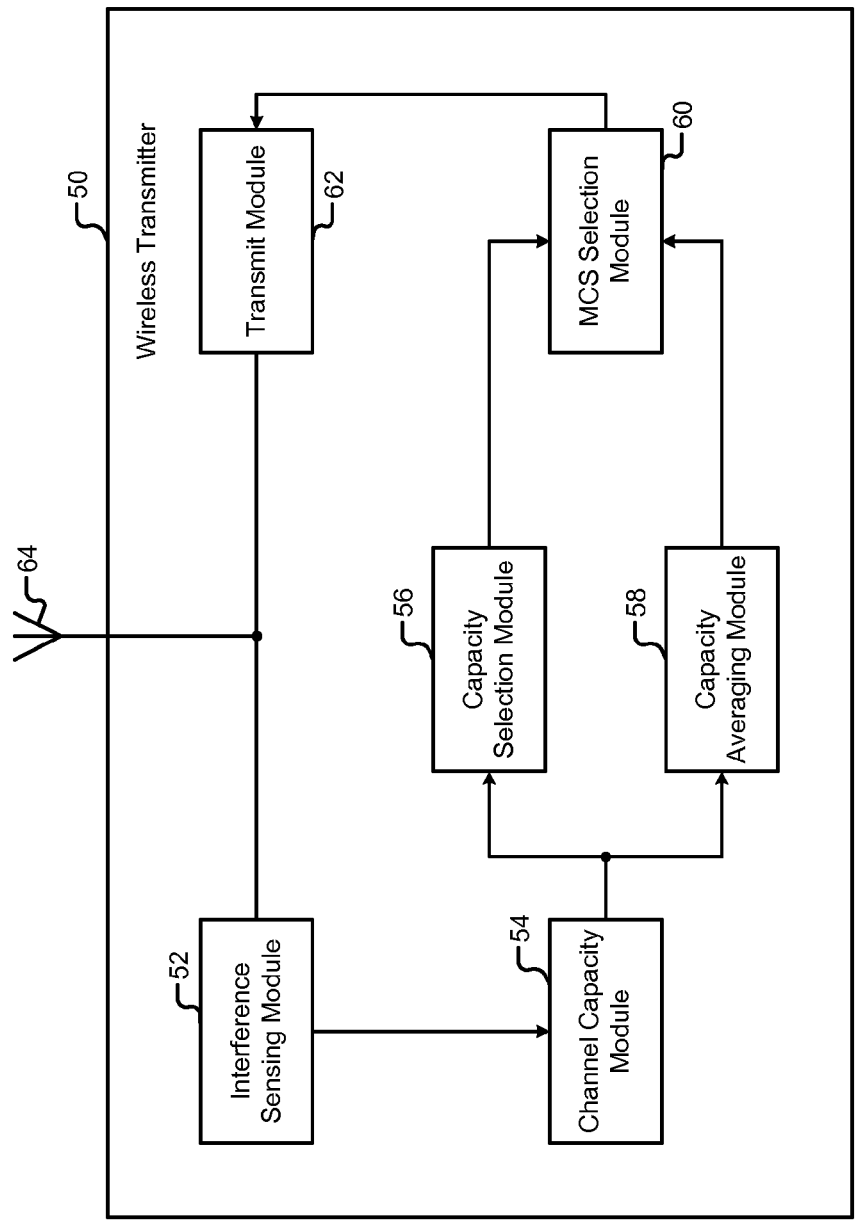
FIG. 2A is a functional block diagram of an exemplary system for selecting a modulation and coding scheme (MCS) to transmit signals according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

When selecting modulation and coding schemes (MCSs) to transmit signals, traditional wireless transmitters treat interference as noise. Specifically, interference signals, which are signals transmitted by other transmitters to other receivers, are traditionally treated as Gaussian noise signals. Most interference signals, however, are not Gaussian since most interference signals are modulated using a modulation scheme having a finite constellation size while Gaussian noise signals are unmodulated.

The present disclosure proposes systems and methods for selecting MCSs that distinguish interference signals from Gaussian noise signals instead of treating interference signals as Gaussian noise signals. Transmitters may select MCSs more accurately when interference signals are distinguished from Gaussian noise signals than when interference signals treated as Gaussian noise signals.

The detailed description is organized as follows. Initially, a mathematical model is proposed for a receive signal that includes an intended transmit signal, an interference signal, and a Gaussian noise signal. A modulation constrained capacity (MCC) of a channel for a given modulation scheme is derived using the mathematical model, where the MCC is a maximum number of bits that can be reliably transmitted over the channel using the modulation scheme. Thereafter, systems and methods for selecting an MCS by generating MCCs for multiple modulation schemes of transmit and interference signals are discussed. An example of selecting the MCS and examples of downlink and uplink transmissions using the systems and methods of the present disclosure follow.

A receive signal Y[n] received by a receiver from the transmitter may be mathematically represented as follows.

$$Y[n] = h_D[n]X[n] + h_I[n]I[n] + N[n]$$

X[n] is the intended transmit signal (hereinafter transmit signal) having a constellation size M transmitted by the transmitter. I[n] is the interference signal having a constellation size L present in the channel. N[n] is a circularly symmetric complex Gaussian noise signal having zero mean and noise variance of 1 present in the channel. $h_D[n]$ is a direct channel gain. $h_I[n]$ is an interference channel gain. n is a slot index indicating a number of time slots or frequency slots of signals. Traditionally, the interference signal I[n] is merged into (i.e., considered a part of) the Gaussian noise signal N[n] (e.g., $h_I[n]I[n]+N[n]=N'[n]$). The present disclosure, however, treats the interference signal I[n] as distinct from the Gaussian noise signal N[n] as indicated in the mathematical representation of the receive signal.

Typically, an MCS to be used to transmit the transmit signal is selected based on MCC (hereinafter capacity) of the channel for the modulation scheme used by the transmitters. The capacity of the channel (i.e., channel capacity) for the modulation scheme may be generated differently depending on whether the transmitters use coded modulation (CM) or bit-interleaved coded modulation (BICM).

When the transmitters use CM, the channel capacity for the modulation scheme is given by the following equation.

$$C_{MCC} = h(X) - h(X \mid Y)$$

$$= \log_2 M - E_{X,Y}\left[\log_2 \frac{1}{p(X \mid Y)}\right]$$

$$= \log_2 M - E_{X,Y}\left[\log_2 \frac{\sum_{l=1}^{L}\sum_{m=1}^{M} p(Y \mid X = x_m, I - i_l)}{\sum_{l=1}^{L} p(Y \mid X, I - i_l)}\right]$$

where h denotes differential entropy, and a conditional probability density function (PDF) is given by $$p(Y=y\mid X=x, I=i) = \frac{1}{\pi}\exp\{-(y-h_D x - h_I i)^2\}$$

When the transmitters use BICM, the channel capacity for the modulation scheme is given by the following equation.

$$C_{MCC,BICM} = M - \sum_{k=1}^{\log_2 M} E_{b,Y}\left[\log_2 \frac{\sum_{l=1}^{L}\sum_{z\in\Phi} p(Y\mid X=z, I=i_l)}{\sum_{l=1}^{L}\sum_{z\in\Phi_k^b} p(Y\mid X=z, I=i_l)}\right]$$

where $\Phi$ denotes set of all signal constellation points, $\Phi_k^b$ denotes set of signal constellation points x whose $k^{th}$ bit position has a value of b, and the conditional PDF is given by $$p(Y=y\mid X=x, I=i) = \frac{1}{\pi}\exp\{-(y-h_D x - h_I i)^2\}$$

The channel capacity is a function of the constellation size M of the transmit signal, the constellation size L of the interference signal, the direct channel gain $h_D$, and the magnitude and the phase of the interference channel gain $h_I$. When multiple interference signals are present, the magnitude and the phase of the interference channel gain for each interference signal are considered. When no interference signals are present, the channel capacity is a function of M and $h_D$. M is known based on the MCS intended to be used to transmit the transmit signal. L can be known by decoding the interference signal. Channel capacities for various modulation schemes may be generated using numerical methods and analyses and stored in a lookup table. The transmitter may use the lookup table to select a suitable MCS to transmit the transmit signal in the presence of the interference signal.

Specifically, the present disclosure relates to generating channel capacities for various prospective modulation schemes of the transmit signal by considering known or all possible modulation schemes of the interference signal. The channel capacities of the prospective modulation schemes are compared to threshold channel capacities of MCSs that use the respective modulation schemes. The MCS for which the channel capacity of the modulation scheme is greater than the threshold channel capacity of the MCS is selected as the MCS to be used to transmit the transmit signal. When more than one MCS exists for which the channel capacity of the modulation scheme is greater than the threshold capacity of the MCS, the MCS having the highest data rate is selected as the MCS to be used to transmit the transmit signal.

Referring now to FIG. 2A, a transmitter 50 comprising a system for selecting MCS by generating channel capacities for multiple modulation schemes of transmit and interference signals is shown. The system comprises an interference sensing module 52, a channel capacity module 54, a capacity selection module 56, a capacity averaging module 58, and an MCS selection module 60. Additionally, the transmitter 50 comprises a transmit module 62 and an antenna 64. The transmit module 62 modulates the transmit signal using the MCS selected by the MCS selection module 60 and transmits the transmit signal over the channel via the antenna 64.

The interference sensing module 52 senses the interference signal that may be present in the channel via the antenna 64. The interference sensing module 52 informs the channel capacity module 54 when the interference signal is not detected. When the interference signal is detected, the interference sensing module 52 may detect modulation scheme information of the interference signal and communicate the modulation scheme information to the channel capacity module 54. The modulation scheme information may include the modulation scheme used to modulate the interference signal and whether the modulation scheme changes over n slots. The modulation scheme of the interference signal may change from slot to slot, where slots may be time slots or frequency slots.

Occasionally, however, the modulation scheme information of the interference signal may be unavailable. When the modulation scheme information is unavailable, the channel capacity module 54 generates capacities for each modulation scheme that may be used to transmit the transmit signal for all modulation schemes that may be used by the interference signal. The channel capacity module 54 generates the capacities for the given channel gain at each slot.

Let M1 and M2 denote types of modulation schemes of the transmit signal and the interference signal, respectively, where M1 and M2 are integers greater than or equal to 1. M1 and M2 may include any modulation scheme (e.g., quadrature amplitude modulation (QAM), quadrature phase-shift keying (QPSK) modulation, etc.). For example only, M1 may include 4QAM, 16QAM, and 64QAM; and M2 may include 4QAM, 16QAM, and 64QAM.

Further, as an example only, the permissible coding rates (also called data rates) for each of the M1 modulation schemes may include 1/2, 2/3, 3/4, and 5/6. A set S1 of a total number of MCSs for the intended transmit signal may include M1*(number of permissible coding rates per M1). For example, when M1=3, and number of permissible coding rates=4, S1 may include a total of 12 MCSs. The MCS selection module 60 may select one of the S1 MCSs to transmit the transmit signal as follows.

Specifically, the channel capacity module 54 may generate capacities for each of the M1 modulation schemes considering that the interference signal may have any of the M2 modulation schemes. Accordingly, the channel capacity module 54 may generate M1 sets of capacities, where each set has M2 capacities. In other words, the channel capacity module 54 may generate a total of C=M1*M2 capacities. For example, when the M1 and M2 modulation schemes each include 4QAM, 16QAM, and 64QAM, the channel capacity module 54 may generate the C capacities as follows.

The channel capacity module 54 may generate capacities for the modulation scheme 4QAM of the transmit signal for all possible modulation schemes of the interference signal (e.g., 4QAM, 16QAM, and 64QAM). The capacities are given by $C_{4QAM,4QAM}[n]$, $C_{4QAM,16QAM}[n]$, $C_{4QAM,64QAM}[n]$.

The channel capacity module 54 may generate capacities for the modulation scheme 16QAM of the transmit signal for all possible modulation schemes of the interference signal (e.g., 4QAM, 16QAM, and 64QAM). The capacities are given by $C_{16QAM,4QAM}[n]$, $C_{16QAM,16QAM}[n]$, $C_{16QAM,64QAM}[n]$.

The channel capacity module 54 may generate capacities for the modulation scheme 64QAM of the transmit signal for all possible modulation schemes of the interference signal (e.g., 4QAM, 16QAM, and 64QAM). The capacities are given by $C_{64QAM,4QAM}[n]$, $C_{64QAM,16QAM}[n]$, $C_{64QAM,64QAM}[n]$.

Next, the capacity selection module 56 may select one of the capacities for each of the M1 modulation schemes from each of the M1 sets of capacities. Since the probability that the interference signal may have any one of the M2 modulation schemes is equal to 1/M2, the capacity selection module 56 may average the capacities of each set and select the average capacity for each of the M1 modulation schemes as follows.

$$C_{4QAM}[n] = \frac{1}{3}(C_{4QAM,4QAM}[n] + C_{4QAM,16QAM}[n] + C_{4QAM,64QAM}[n])$$

$$C_{16QAM}[n] = \frac{1}{3}(C_{16QAM,4QAM}[n] + C_{16QAM,16QAM}[n] + C_{16QAM,64QAM}[n])$$

$$C_{64QAM}[n] = \frac{1}{3}(C_{64QAM,4QAM}[n] + C_{64QAM,16QAM}[n] + C_{64QAM,64QAM}[n])$$

Alternatively, when receivers cannot cancel interference, the capacity selection module 56 may conservatively select a smallest of the capacities in each set for each of the M1 modulation schemes as follows.

$$C_{4QAM}[n] = \min\{C_{4QAM,4QAM}[n], C_{4QAM,16QAM}[n], C_{4QAM,64QAM}[n]\}$$

$$C_{16QAM}[n] = \min\{C_{16QAM,4QAM}[n], C_{16QAM,16QAM}[n], C_{16QAM,64QAM}[n]\}$$

$$C_{64QAM}[n] = \min\{C_{64QAM,4QAM}[n], C_{64QAM,16QAM}[n], C_{64QAM,64QAM}[n]\}$$

When, however, the modulation scheme information of the interference signal is available, the channel capacity module 54 may generate only M1 capacities based on each of the M1 modulation schemes and the known modulation scheme of the interference signal. For example, when the modulation scheme of the interference signal is 16QAM, the channel capacity module 54 may generate only $C_{4QAM,16QAM}[n]$, $C_{16QAM,16QAM}[n]$, $C_{64QAM,64QAM}[n]$. Accordingly, $C_{4QAM}[n] = C_{4QAM,16QAM}[n]$, $C_{16QAM}[n] = C_{16QAM,16QAM}[n]$, and $C_{64QAM}[n] = C_{64QAM,16QAM}[n]$.

The capacity averaging module 58 may generate an average capacity for each of the M1 modulation schemes by averaging the selected capacities for each of the M1 modulation schemes over all n slots as follows.

$$C_{4QAM} = \frac{1}{N}\sum_{n=0}^{N-1} C_{4QAM}[n]$$

$$C_{16QAM} = \frac{1}{N}\sum_{n=0}^{N-1} C_{16QAM}[n]$$

$$C_{64QAM} = \frac{1}{N}\sum_{n=0}^{N-1} C_{64QAM}[n]$$

The MCS selection module 60 may compare the average capacity of each of the M1 modulation schemes to a threshold capacity for the respective MCS. The threshold capacity may be based on a predetermined packet length and a predetermined target probability of error for each of the M1 modulation schemes. The MCS selection module 60 may select one of the S1 MCSs for which the average capacity of the modulation scheme is greater than the threshold capacity of the MCS. When more than one MCS exists for which the average capacity of the modulation scheme is greater than the threshold capacity of the MCS, the MCS having the highest data rate is selected. The selected one of the S1 MCSs is used to transmit the transmit signal in the channel in the presence of the interference signal.

When the modulation scheme of the interference signal is unchanged over the n slots, the capacity averaging module 58 may first average each of the C capacities over all slots as follows.

$$C_{4QAM,4QAM} = \frac{1}{N}\sum_{n=0}^{N-1} C_{4QAM,4QAM}[n]$$

$$C_{4QAM,16QAM} = \frac{1}{N}\sum_{n=0}^{N-1} C_{4QAM,16QAM}[n]$$

$$C_{4QAM,64QAM} = \frac{1}{N}\sum_{n=0}^{N-1} C_{4QAM,64QAM}[n]$$

$$C_{16QAM,4QAM} = \frac{1}{N}\sum_{n=0}^{N-1} C_{16QAM,4QAM}[n]$$

$$C_{16QAM,16QAM} = \frac{1}{N}\sum_{n=0}^{N-1} C_{16QAM,16QAM}[n]$$

$$C_{16QAM,64QAM} = \frac{1}{N}\sum_{n=0}^{N-1} C_{16QAM,64QAM}[n]$$

$$C_{64QAM,4QAM} = \frac{1}{N}\sum_{n=0}^{N-1} C_{64QAM,4QAM}[n]$$

$$C_{64QAM,16QAM} = \frac{1}{N}\sum_{n=0}^{N-1} C_{64QAM,16QAM}[n]$$

$$C_{64QAM,64QAM} = \frac{1}{N}\sum_{n=0}^{N-1} C_{64QAM,64QAM}[n]$$

Subsequently, the capacity selection module 56 may select a capacity for each of the M1 modulation schemes as follows.

$$C_{4QAM} = \frac{1}{3}(C_{4QAM,4QAM} + C_{4QAM,16QAM} + C_{4QAM,64QAM})$$

$$C_{16QAM} = \frac{1}{3}(C_{16QAM,4QAM} + C_{16QAM,16QAM} + C_{16QAM,64QAM})$$

$$C_{64QAM} = \frac{1}{3}(C_{64QAM,4QAM} + C_{64QAM,16QAM} + C_{64QAM,64QAM})$$

or $$C_{4QAM} = \min\{C_{4QAM,4QAM}, C_{4QAM,16QAM}, C_{4QAM,64QAM}\}$$

$$C_{16QAM} = \min\{C_{16QAM,4QAM}, C_{16QAM,16QAM}, C_{16QAM,64QAM}\}$$

$$C_{64QAM} = \min\{C_{64QAM,4QAM}, C_{64QAM,16QAM}, C_{64QAM,64QAM}\}$$

Thereafter, the MCS selection module 60 may compare the selected capacity of each of the M1 modulation schemes to the threshold capacity for the respective MCS. The MCS selection module 60 may select one of the S1 MCSs for which the selected capacity of the modulation scheme is greater than the threshold capacity of the MCS. When more than one MCS exists for which the selected capacity of the modulation scheme is greater than the threshold capacity of the MCS, the MCS having the highest data rate is selected. The selected one of the S1 MCSs is used to transmit the transmit signal in the channel in the presence of the interference signal.

When no interference signals are present, the channel capacity module 54 may generate a channel capacity for each of the M1 modulation schemes of the transmit signal. The capacity averaging module 58 may average the channel capacity of each of the M1 modulation schemes over n slots. The MCS selection module 60 may compare the average capacity of each of the M1 modulation schemes to the threshold capacity for the respective MCS. The MCS selection module 60 may select one of the S1 MCSs for which the average capacity of the modulation scheme is greater than the threshold capacity of the MCS. When more than one MCS exists for which the average capacity of the modulation scheme is greater than the threshold capacity of the MCS, the MCS having the highest data rate is selected. The selected one of the S1 MCSs may be used to transmit the transmit signal in the channel. An example of selecting the MCS according to the present disclosure follows.

Referring now to FIG. 2B, an exemplary table of prospective MCSs having different threshold capacities and data rates for transmitting the transmit signal is shown. For example only, the modulation schemes to be used to transmit the transmit signal may include QPSK and 16QAM modulation schemes. Additionally, for example only, the data rates for QPSK modulation scheme may include 1/3, 2/3, and 3/4, and the data rates for 16QAM modulation scheme may include 1/3 and 2/3. All data rates may or may not be permissible. When the interference signal is modulated using the same MCSs as the transmit signal, for a single slot (i.e., for n=1), the MCS selection module 60 may select the MCS to transmit the transmit signal as follows.

When the interference signal is modulated using a QPSK modulation scheme (i.e., one of MCSs 1-3) and QPSK modulation scheme is a prospective modulation scheme for the transmit signal, C_QPSK,QPSK may be 1.8. Additionally, when 16QAM is another prospective modulation scheme for the transmit signal, C__16QAM,QPSK may be 2.1. Out of the MCSs 1-3 that use the QPSK modulation scheme, C_QPSK, QPSK of 1.8 is greater than a threshold capacity 1.7 of MCS 3, which has the highest data rate among the MCSs 1-3. Out of the MCSs 4 and 5 that use the 16QM modulation scheme, C__16QAM,QPSK of 2.1 is greater than a threshold capacity 1.8 of MCS 4 but is less than a threshold value 3.0 of MCS 5. Thus, MCS 3 using the modulation scheme QPSK 3/4 and MCS 4 using the modulation scheme 16 QAM 1/3 are possible candidates for transmitting the transmit signal. Between MCS 3 and MCS 4, the QPSK 3/4 modulation scheme of MCS 3 has greater data rate than the 16QAM 1/3 modulation scheme of MCS 4. Accordingly, MCS 3 using the QPSK 3/4 modulation scheme is finally selected, and the transmit signal is transmitted using the QPSK 3/4 modulation scheme.

Referring now to FIG. 3, a method 100 for selecting MCS by generating channel capacities for multiple modulation schemes of transmit and interference signals is shown. The method begins in step 102. The interference sensing module 52 determines in step 104 whether interference is present in the channel. If the result of step 104 is false, the channel capacity module 54 generates a channel capacity for each intended modulation scheme of the transmit signal in step 106. The capacity averaging module 58 averages the channel capacity of each intended modulation scheme of the transmit signal over n slots in step 108.

If, however, the result of step 104 is true, the interference sensing module 52 determines in step 110 whether the modulation scheme of the interference signal is known and generates modulation scheme information of the interference signal. If the result of step 110 is true, the channel capacity module 54 generates a channel capacity for each intended modulation scheme of the transmit signal for the known modulation scheme of the interference signal in step 112. The capacity averaging module 58 averages the channel capacity of each intended modulation scheme of the transmit signal for the known modulation scheme of the interference signal over n slots in step 108.

If, however, the result of step 110 is false, the channel capacity module 54 generates channel capacities for each intended modulation scheme of the transmit signal for all possible modulation schemes of the interference signal in step 114. Based on the modulation scheme information, whether the modulation scheme of the interference signal changes over n slots is determined in step 116.

If the result of step 116 is true, the capacity selection module 56 selects one of the channel capacities for each intended modulation scheme of the transmit signal in step 118 by selecting the minimum or the average of the channel capacities generated for the respective intended modulation schemes. The capacity averaging module 58 generates average capacity for each intended modulation scheme of the transmit signal by averaging the selected channel capacities of the respective intended modulation schemes over n slots in step 120.

If, however, the result of step 116 is false, the capacity averaging module 58 generates averaged capacities by averaging the channel capacities over n slots in step 122. The capacity selection module 56 selects one of the averaged capacities for each intended modulation scheme in step 124 by selecting the minimum or the average of the averaged capacities generated for the respective intended modulation schemes.

At the end of steps 108, 120 or 124, the MCS selection module 60 selects the MCS for which the average capacity of the modulation scheme exceeds the threshold capacity of the MCS in step 126. The MCS selection module 60 determines in step 128 if more than one MCS exists for which the average capacity exceeds the threshold capacity. If the result of step 128 is false, the method 100 ends in step 132. If the result of step 128 is true, the MCS selection module 60 selects the MCS that has the highest data rate in step 130. The method 100 ends in step 132.

The systems and methods for selecting MCS described in the present disclosure can select the MCS to reliably transmit the transmit signal when interference signals are 10 dB stronger than the transmit signal (i.e., when $(h_I/h_D)=10$ dB). The systems and methods can be used in any wireless system where transmit signals may encounter interference signals that are generated by other transmitters and that are present in addition to noise signals. Transmitters utilizing the systems and methods perform best when used in conjunction with receivers capable of cancelling interference.

Figure 4A:
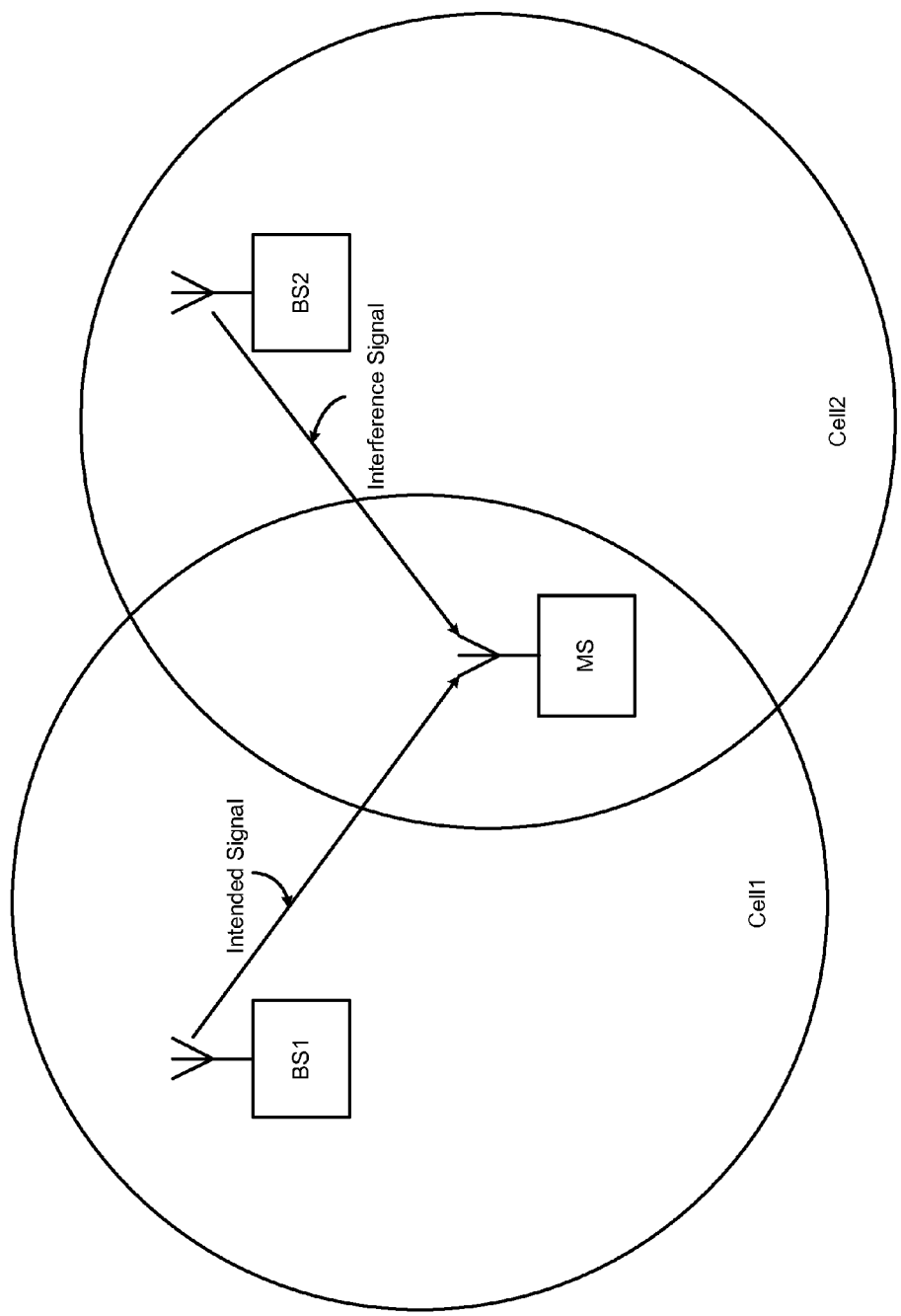
FIG. 4A depicts downlink transmissions of an exemplary cellular communication system according to the present disclosure.
Figure 4B:
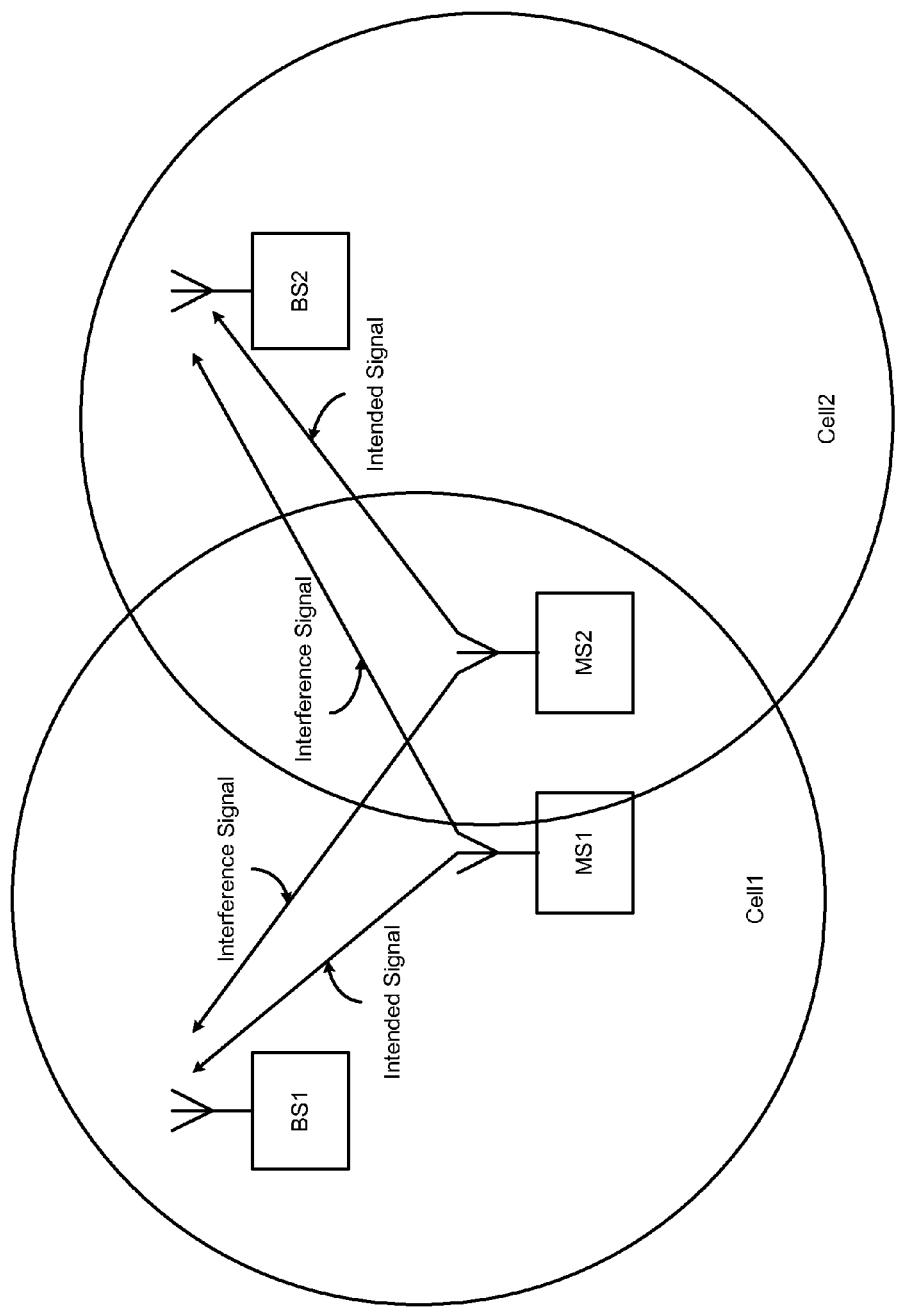
FIG. 4B depicts uplink transmissions of an exemplary cellular communication system according to the present disclosure.

Referring now to FIGS. 4A and 4B, the teachings of the present disclosure may be used by base stations and mobile stations of cellular communication systems when performing downlink and uplink transmissions. In FIG. 4A, a downlink transmission of an exemplary cellular communication system is shown. The cellular system may comprise two base stations BS1 and BS2 each communicating with mobile stations in Cell1 and Cell2, respectively. When a mobile station (MS) is associated with BS1 at a location shown, the MS may receive the intended transmit signal from BS1 and the interference signal from BS2. The MS may decode the modulation scheme information of BS2 by decoding the interference signals received from BS2. The MS then may select the MCS and feed back the selected MCS to BS1. BS1 subsequently transmits data to the MS using the MCS provided by the MS.

In FIG. 4B, an uplink transmission of an exemplary cellular communication system is shown. The cellular system may comprise two mobile stations MS1 and MS2 that are associated with base stations BS1 and BS2, respectively. BS1 may receive the modulation scheme information of MS2 from BS2 via a backbone network. BS1 then selects the MCS to transmit data to MS1 and informs MS1 about the selected MCS. Subsequently, MS1 transmits data to BS1 using the selected MCS assigned by BS1.

Figure 5B:
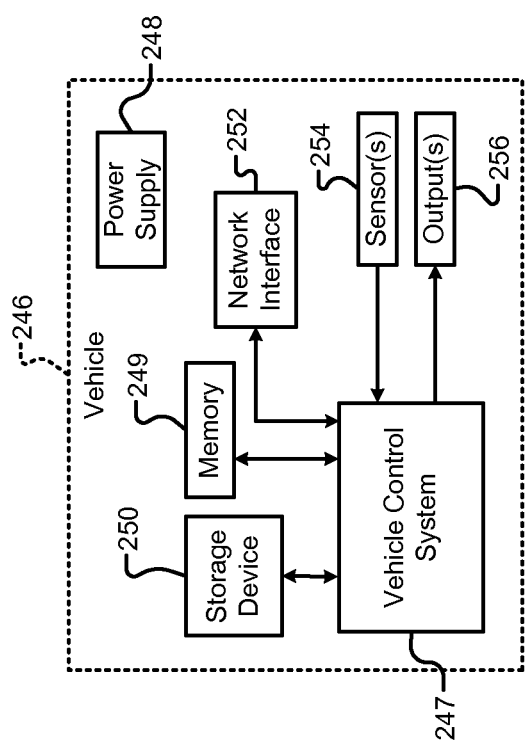
FIG. 5B is a functional block diagram of a vehicle control system.
Figure 5A:
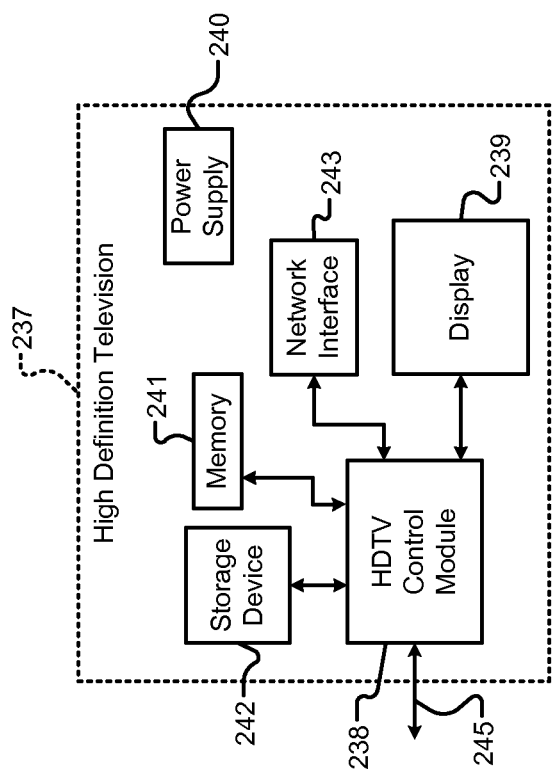
FIG. 5A is a functional block diagram of a high definition television.

Referring now to FIGS. 5A-5E, various exemplary implementations incorporating the teachings of the present disclosure are shown. In FIG. 5A, the teachings of the disclosure can be implemented in a network interface 243 of a high definition television (HDTV) 237. Specifically, the teachings may be implemented in a wireless transmitter of the network interface 243 when the network interface 243 communicates wirelessly via an antenna (not shown). The HDTV 237 includes an HDTV control module 238, a display 239, a power supply 240, memory 241, a storage device 242, the network interface 243, and an external interface 245.

The HDTV 237 can receive input signals from the network interface 243 and/or the external interface 245, which can send and receive data via cable, broadband Internet, and/or satellite. The HDTV control module 238 may process the input signals, including encoding, decoding, filtering, and/or formatting, and generate output signals. The output signals may be communicated to one or more of the display 239, memory 241, the storage device 242, the network interface 243, and the external interface 245.

Memory 241 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 242 may include an optical storage drive, such as a DVD drive, and/or a hard disk drive (HDD). The HDTV control module 238 communicates externally via the network interface 243 and/or the external interface 245. The power supply 240 provides power to the components of the HDTV 237.

In FIG. 5B, the teachings of the disclosure may be implemented in a network interface 252 of a vehicle 246. Specifically, the teachings may be implemented in a wireless transmitter of the network interface 252 when the network interface 252 communicates wirelessly via an antenna (not shown). The vehicle 246 may include a vehicle control system 247, a power supply 248, memory 249, a storage device 250, and the network interface 252. The vehicle control system 247 may be a powertrain control system, a body control system, an entertainment control system, an anti-lock braking system (ABS), a navigation system, a telematics system, a lane departure system, an adaptive cruise control system, etc.

The vehicle control system 247 may communicate with one or more sensors 254 and generate one or more output signals 256. The sensors 254 may include temperature sensors, acceleration sensors, pressure sensors, rotational sensors, airflow sensors, etc. The output signals 256 may control engine operating parameters, transmission operating parameters, suspension parameters, brake parameters, etc.

The power supply 248 provides power to the components of the vehicle 246. The vehicle control system 247 may store data in memory 249 and/or the storage device 250. Memory 249 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 250 may include an optical storage drive, such as a DVD drive, and/or a hard disk drive (HDD). The vehicle control system 247 may communicate externally using the network interface 252.

Figure 5D:
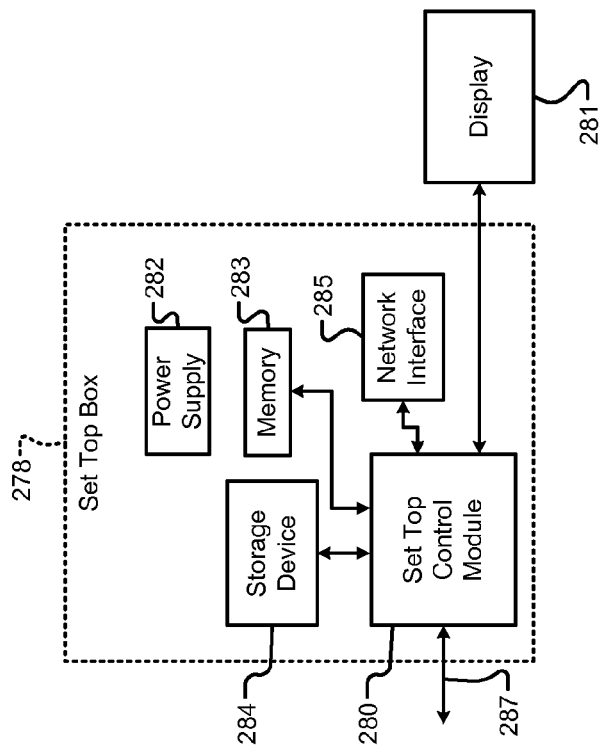
FIG. 5D is a functional block diagram of a set top box.
Figure 5C:
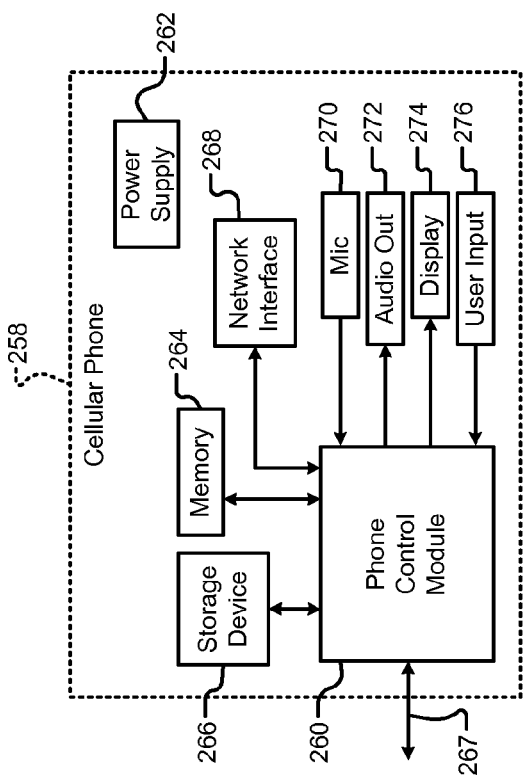
FIG. 5C is a functional block diagram of a cellular phone.

Referring now to FIG. 5C, the teachings of the disclosure can be implemented in a network interface 268 of a cellular phone 258. Specifically, the teachings may be implemented in a wireless transmitter of the network interface 268 when the network interface 268 communicates wirelessly via an antenna (not shown). The cellular phone 258 includes a phone control module 260, a power supply 262, memory 264, a storage device 266, and a cellular network interface 267. The cellular phone 258 may include the network interface 268, a microphone 270, an audio output 272 such as a speaker and/or output jack, a display 274, and a user input device 276 such as a keypad and/or pointing device.

The phone control module 260 may receive input signals from the cellular network interface 267, the network interface 268, the microphone 270, and/or the user input device 276. The phone control module 260 may process signals, including encoding, decoding, filtering, and/or formatting, and generate output signals. The output signals may be communicated to one or more of memory 264, the storage device 266, the cellular network interface 267, the network interface 268, and the audio output 272.

Memory 264 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 266 may include an optical storage drive, such as a DVD drive, and/or a hard disk drive (HDD). The power supply 262 provides power to the components of the cellular phone 258.

Referring now to FIG. 5D, the teachings of the disclosure can be implemented in a network interface 285 of a set top box 278. Specifically, the teachings may be implemented in a wireless transmitter of the network interface 285 when the network interface 285 communicates wirelessly via an antenna (not shown). The set top box 278 includes a set top control module 280, a display 281, a power supply 282, memory 283, a storage device 284, and the network interface 285.

The set top control module 280 may receive input signals from the network interface 285 and an external interface 287, which can send and receive data via cable, broadband Internet, and/or satellite. The set top control module 280 may process signals, including encoding, decoding, filtering, and/or formatting, and generate output signals. The output signals may include audio and/or video signals in standard and/or high definition formats. The output signals may be communicated to the network interface 285 and/or to the display 281. The display 281 may include a television, a projector, and/or a monitor.

The power supply 282 provides power to the components of the set top box 278. Memory 283 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 284 may include an optical storage drive, such as a DVD drive, and/or a hard disk drive (HDD).

Figure 5E:
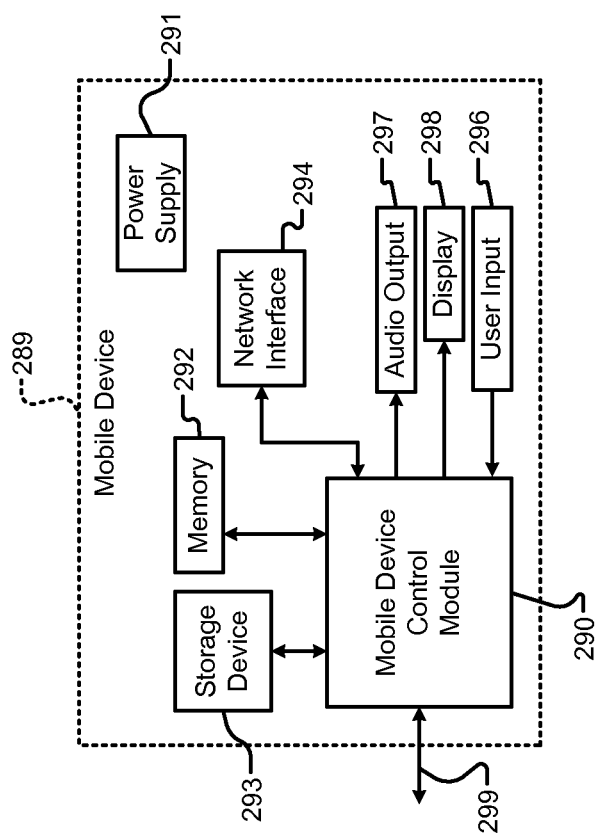
FIG. 5E is a functional block diagram of a mobile device.

Referring now to FIG. 5E, the teachings of the disclosure can be implemented in a network interface 294 of a mobile device 289. Specifically, the teachings may be implemented in a wireless transmitter of the network interface 294 when the network interface 294 communicates wirelessly via an antenna (not shown). The mobile device 289 may include a mobile device control module 290, a power supply 291, memory 292, a storage device 293, the network interface 294, and an external interface 299. If the network interface 294 includes a wireless local area network interface, an antenna (not shown) may be included.

The mobile device control module 290 may receive input signals from the network interface 294 and/or the external interface 299. The external interface 299 may include USB, infrared, and/or Ethernet. The input signals may include compressed audio and/or video, and may be compliant with the MP3 format. Additionally, the mobile device control module 290 may receive input from a user input 296 such as a keypad, touchpad, or individual buttons. The mobile device control module 290 may process input signals, including encoding, decoding, filtering, and/or formatting, and generate output signals.

The mobile device control module 290 may output audio signals to an audio output 297 and video signals to a display 298. The audio output 297 may include a speaker and/or an output jack. The display 298 may present a graphical user interface, which may include menus, icons, etc. The power supply 291 provides power to the components of the mobile device 289. Memory 292 may include random access memory (RAM) and/or nonvolatile memory.

Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 293 may include an optical storage drive, such as a DVD drive, and/or a hard disk drive (HDD). The mobile device may include a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A system comprising:
   a sensing module configured to
      determine whether a signal sensed in a wireless channel is noise or is modulated by a remote device; and
      attempt to determine, in response to the signal being modulated, a modulation scheme of the signal;
   a capacity determination module configured to
      determine capacities of the wireless channel to transmit data using a plurality of modulation schemes,
      wherein in response to the sensing module being able to determine the modulation scheme of the signal, the plurality of modulation schemes includes the modulation scheme of the signal, and
      wherein in response to the sensing module being unable to determine the modulation scheme of the signal, the plurality of modulation schemes includes one or more modulation schemes that the remote device is configured to use to modulate the signal; and
   a transmit module configured to
      select a first modulation scheme of the plurality of modulation schemes based on the capacities of the wireless channel, and
      transmit data over the wireless channel using the first modulation scheme.

2. The system of claim 1, wherein the first modulation scheme has a smallest one of the capacities.

3. The system of claim 1, wherein the first modulation scheme has one of the capacities that is greater than or equal to a predetermined threshold.

4. The system of claim 1, wherein the transmit module is configured to:
   determine whether one or more of the plurality of modulation schemes have capacities greater than or equal to a predetermined threshold, and
   select one of the one or more of the plurality of modulation schemes having a highest data rate as the first modulation scheme.

5. The system of claim 1, further comprising:
   an averaging module configured to generate average capacities over a plurality of time slots or a plurality of frequency slots,
   wherein the transmit module is configured to select one of the plurality of modulation schemes having an average capacity greater than or equal to a predetermined threshold as the first modulation scheme.

6. The system of claim 1, further comprising:
   an averaging module configured to generate average capacities over a plurality of time slots or a plurality of frequency slots,
   wherein the transmit module is configured to
      determine whether one or more of the plurality of modulation schemes have average capacities greater than or equal to a predetermined threshold, and
      select one of the one or more of the plurality of modulation schemes having a highest data rate as first modulation scheme.

7. A wireless device, comprising:
   the system of claim 1,
   wherein the wireless device is associated with a first base station,
   wherein the device transmitting the signal is a second base station,
   wherein the transmit module is configured to transmit the first modulation scheme to the first base station, and
   wherein the wireless device is configured to receive data transmitted from the first base station in accordance with the first modulation scheme.

8. A method comprising:
   determining whether a signal sensed in a wireless channel is noise or is modulated by a remote device;
   attempting to determine, in response to the signal being modulated, a modulation scheme of the signal;
   determining capacities of the wireless channel to transmit data using a plurality of modulation schemes, wherein in response to being able to determine the modulation scheme of the signal, the plurality of modulation schemes includes the modulation scheme of the signal, and wherein in response to being unable to determine the modulation scheme of the signal, the plurality of modulation schemes includes one or more modulation schemes that the remote device is configured to use to modulate the signal;
   selecting a first modulation scheme of the plurality of modulation schemes based on the capacities of the wireless channel; and
   transmitting data over the wireless channel using the first modulation scheme.

9. The method of claim 8, wherein the first modulation scheme has a smallest one of the capacities.

10. The method of claim 8, wherein the first modulation scheme has one of the capacities that is greater than or equal to a predetermined threshold.

11. The method of claim 8, further comprising:
determining whether one or more of the plurality of modulation schemes have capacities greater than or equal to a predetermined threshold; and
selecting one of the one or more of the plurality of modulation schemes having a highest data rate as the first modulation scheme.

12. The method of claim 8, further comprising:
generating average capacities over a plurality of time slots or a plurality of frequency slots; and
selecting one of the plurality of modulation schemes having an average capacity greater than or equal to a predetermined threshold as the first modulation scheme.

13. The method of claim 8, further comprising:
generating average capacities over a plurality of time slots or a plurality of frequency slots;
determining whether one or more of the plurality of modulation schemes have average capacities greater than or equal to a predetermined threshold; and
selecting one of the one or more of the plurality of modulation schemes having a highest data rate as the first modulation scheme.

\* \* \* \* \*